US012560311B2

(12) United States Patent
Yu et al.

(10) Patent No.: US 12,560,311 B2
(45) Date of Patent: Feb. 24, 2026

(54) METHODS AND SYSTEMS FOR A MODULAR DOWNLIGHT

(71) Applicant: NICOR, INC., Albuquerque, NM (US)

(72) Inventors: Jiabin Yu, Zhongshan City (CN); Yunhong Hu, Zhongshan City (CN); Dezhong Zeng, Foshan City (CN)

(73) Assignee: NICOR, INC., Albuquerque, NM (US)

( * ) Notice: Subject to any disclaimer, the term of this patent is extended or adjusted under 35 U.S.C. 154(b) by 0 days.

(21) Appl. No.: 18/674,019

(22) Filed: May 24, 2024

(65) Prior Publication Data

US 2024/0392955 A1 Nov. 28, 2024

Related U.S. Application Data

(60) Provisional application No. 63/468,620, filed on May 24, 2023.

(51) Int. Cl.

| | |
|---|---|
| ***F21V 21/00*** | (2006.01) |
| ***F21S 8/02*** | (2006.01) |
| ***F21V 14/06*** | (2006.01) |
| ***F21V 19/00*** | (2006.01) |
| ***F21V 21/04*** | (2006.01) |
| ***F21V 23/00*** | (2015.01) |
| *F21Y 115/10* | (2016.01) |

(52) U.S. Cl.

CPC ............ *F21V 21/047* (2013.01); *F21S 8/026* (2013.01); *F21V 14/06* (2013.01); *F21V 19/004* (2013.01); *F21V 23/008* (2013.01); *F21Y 2115/10* (2016.08)

(58) Field of Classification Search

CPC ...... F21V 21/047; F21V 14/06; F21V 19/004; F21V 23/008; F21S 8/026

See application file for complete search history.

(56) References Cited

U.S. PATENT DOCUMENTS

| | | | | |
|---|---|---|---|---|
| 10,704,779 B1 * | 7/2020 | Zhang | ..................... | F21V 14/06 |
| 11,402,060 B2 * | 8/2022 | Lucas | ..................... | F21V 21/14 |
| 11,892,141 B1 * | 2/2024 | Hung | ..................... | F21V 21/30 |
| 2022/0349535 A1 * | 11/2022 | Sonneman | .............. | F21S 8/026 |
| 2023/0107356 A1 * | 4/2023 | Wedekind | ............. | F21V 21/049 362/404 |

* cited by examiner

*Primary Examiner* — Gerald J Sufleta, II
(74) *Attorney, Agent, or Firm* — LOZA & LOZA, LLP

(57) ABSTRACT

A luminaire can include a light engine producing a light beam, a zoomable optic changing the light beam's solid angle, and a light conditioner that may diffuse the light beam, split the light beam, or produce a wall wash beam from the light beam. The luminaire may removably attach to a frame mounted in a ceiling. A power supply powering the light engine and a collar may also removably attach to the frame. The luminaire is located in a collar hole in the frame to thereby pass through the ceiling. The collar adapts the collar hole for differently sized luminaires such as 4 inch or 6 inch luminaires.

19 Claims, 15 Drawing Sheets

METHODS AND SYSTEMS FOR A MODULAR DOWNLIGHT

CROSS REFERENCE TO RELATED APPLICATIONS

This patent application claims the priority and benefit of U.S. Provisional Patent Application 63/468,620 titled "METHODS AND SYSTEMS FOR A MODULAR DOWNLIGHT" and filed May 24, 2023. U.S. Provisional Patent Application 63/468,620 is herein incorporated by reference in their entirety.

TECHNICAL FIELD

The technical field relates to lighting, light emitting diodes, light emitting diode (LED) lighting, and downlights. In particular, modular downlights that can be easily adapted to meet varying requirements by swapping components are discussed.

BACKGROUND

LED lighting technology continues to advance with increasingly efficient and reliable drivers and LEDs. Other areas of improvement include manufacturability and a focus on improving the customer experience by providing products that are easy to install.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a system. The system can include a frame that includes a frame body, two hanger bars attached on opposite sides of the frame body, a driver retainer, a driver retention clip, a collar locking clip, and collar retainers. The system can also include a power source that is removably attached to the frame by the driver retainer and the driver retention clip, a collar that is removably attached to the frame by the collar retainers and the collar locking clip, and a luminaire that passes through the collar and that is powered by the power source, wherein the luminaire includes spring clips that prevent the luminaire from falling out of the frame.

In some implementations of the methods and devices, the luminaire includes a light engine that produces light in a beam, and the light engine includes a zoomable optic configured to vary a beam angle of the beam. In some implementations of the methods and devices, the system further includes a conditioning optic attached to the light engine, wherein the conditioning optic diffuses the beam, produces a split beam from the beam, or produces a wall wash beam from the beam.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The claimed embodiments may be embodied in other specific forms without departing from its spirit or essential characteristics. The described embodiments are to be considered in all respects only as illustrative and not restrictive. The scope of the claims is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Figure 1:
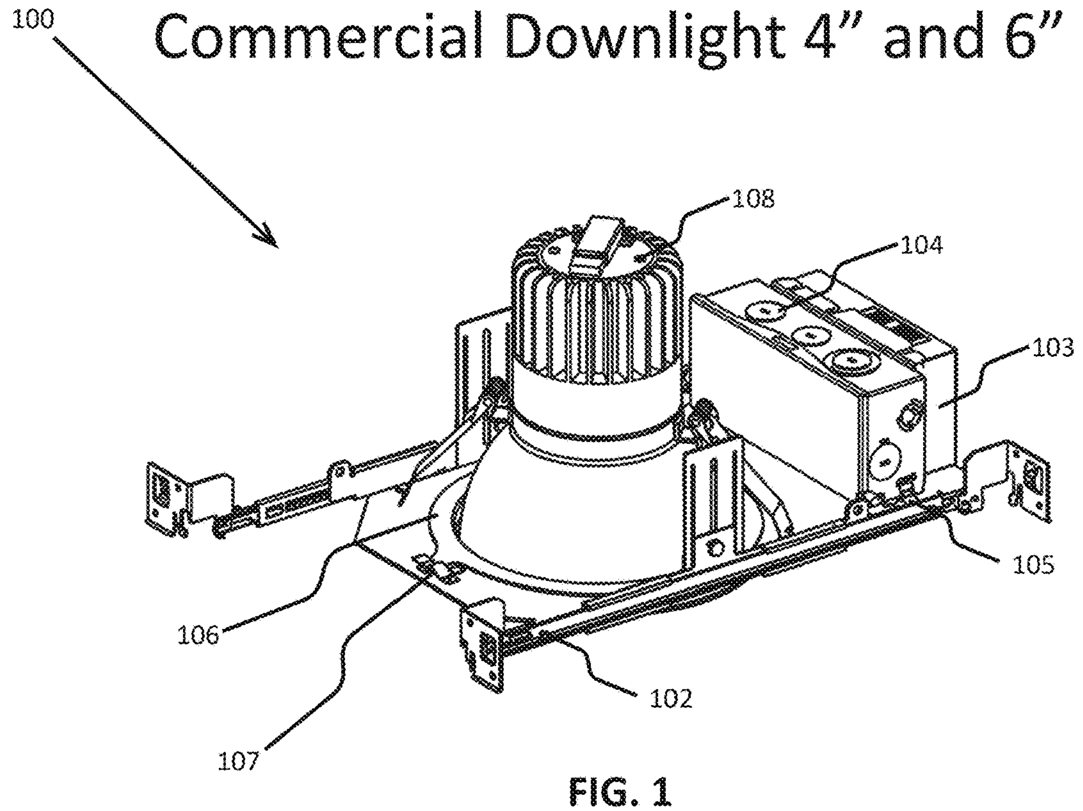
FIG. 1 is an illustration of a modular downlight that can be easily adapted for a variety of installation scenarios and lighting needs, according to some aspects.

FIG. 1 is a rendering of a modular downlight 100 that can be easily adapted for a variety of installation scenarios and lighting needs, according to some aspects. The modular downlight 100 has a frame 102, a driver 103, a junction box 104, and a luminaire 108. The driver 103 and the junction box are joined to one another as a power source. The power source is attached to the frame by driver retention clips 105. The luminaire is attached to the frame 102 by a collar 106 that rotates to engage collar retainers. A collar locking clip 107 prevents the collar 106 from rotating free of the collar retainers.

Figure 2:
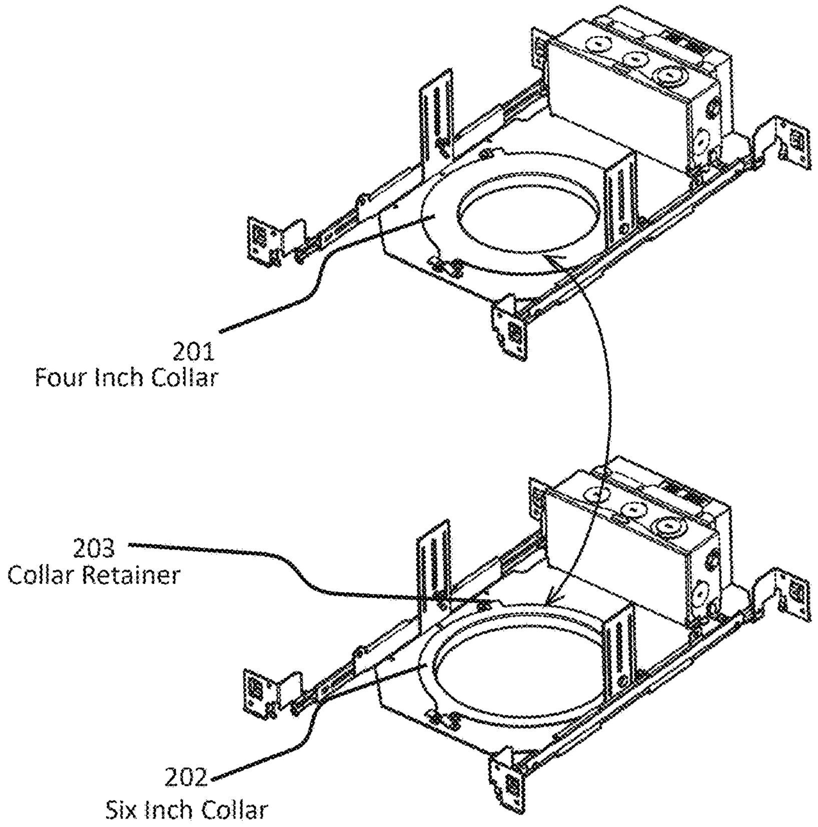
FIG. 2 is an illustration of a frame with a four inch collar and a frame with a six inch collar, according to some aspects.

FIG. 2 is a rendering of a frame with a four inch collar 201 and a frame with a six inch collar 202, according to some aspects. The frame has collar retainers 203 and the collar has retention tabs. The retention tabs of the collars can rotate into the collar retainers 203 to thereby attach the collar to the frame. The four inch collar 201 and the six inch collar 202 are interchangeable to thereby adapt the frame to hold a four inch luminaire or a six inch luminaire.

Figure 3:
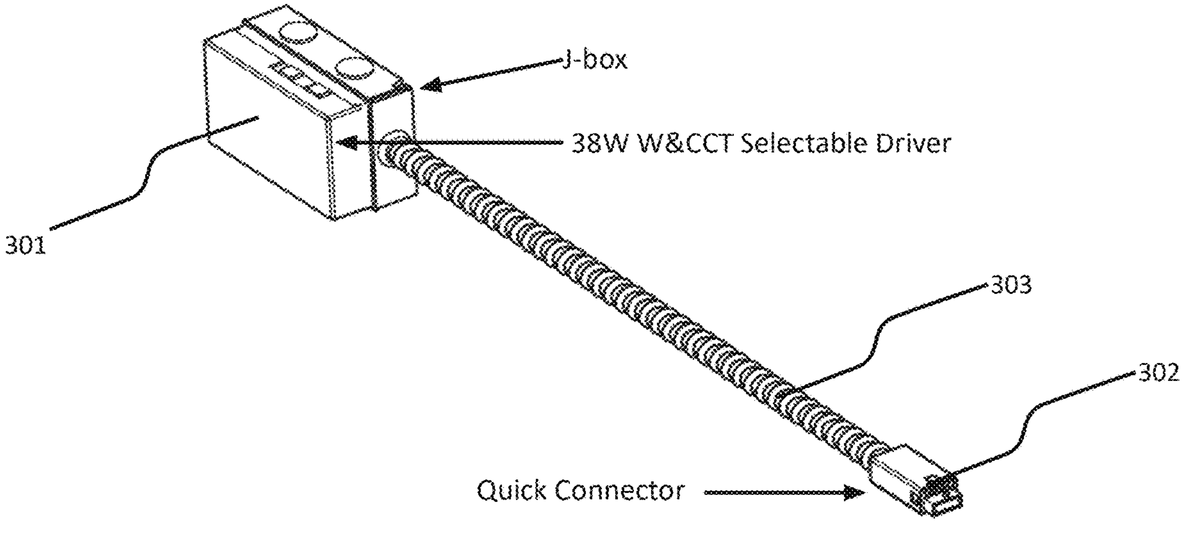
FIG. 3 is an illustration of a power source, according to some aspects.

FIG. 3 is a rendering of a power source 301, according to some aspects. The power source 301 includes the driver 103 and the junction box 104. A driver cable 303 attached to the power source 301 has a quick connector 302 that can be attached to the luminaire 108 to thereby supply electric power to the luminaire. The illustrated driver is a 38 W driver that is dimmable and that has a correlated color temperature (CCT) selector switch. CCT is notoriously well known to those practiced in the art.

Figure 4:
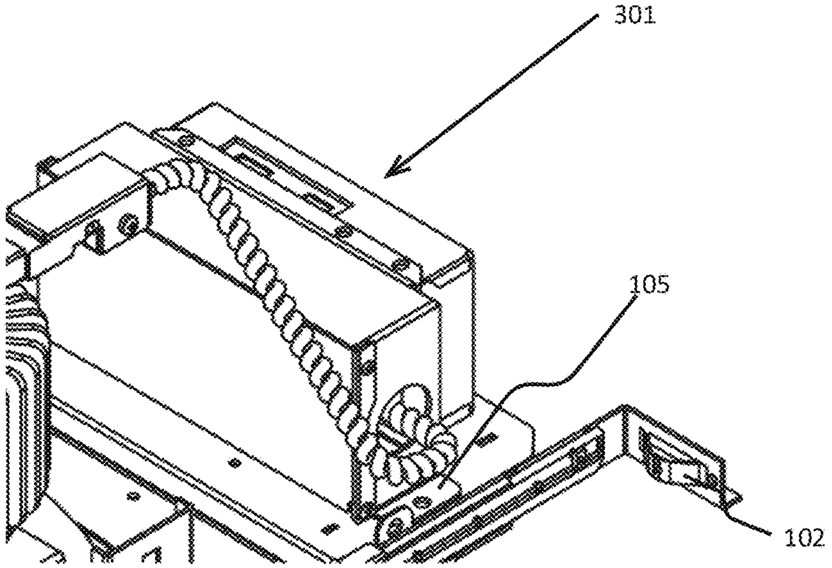
FIG. 4 is an illustration of driver retention clip that is used to attach the power source to a frame, according to some aspects.

FIG. 4 is a rendering of driver retention clip 105 that is used to attach the power source 301 to a frame 102, according to some aspects.

Figure 5:
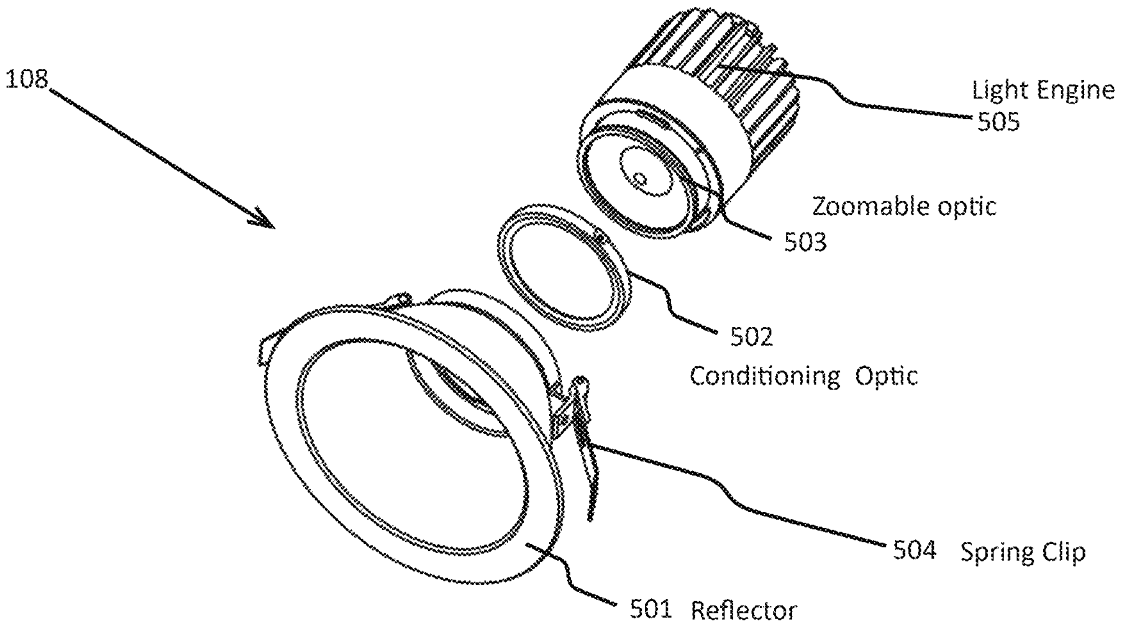
FIG. 5 is a partially exploded view of a luminaire, according to some aspects.

FIG. 5 is a partially exploded view of a luminaire 108, according to some aspects. The luminaire 108 has a light engine 505, a reflector 501 and a zoomable optic 503. There are multiple implementations of the zoomable optic 503. One of the implementations produces a minimum beam angle of 35 degrees and a maximum beam angle of 60 degrees. Another one of the implementations produces a minimum beam angle of 15 degrees and a maximum beam angle of 36 degrees. There are zoomable optics for both the 6" luminaire and the 4" luminaire. A spring clip 504 can keep the luminaire from falling out of the frame. The reflector 501 can hold a conditioning optic 502 in front of the zoomable optic. The conditioning optic can configure the luminaire to produce a wall wash pattern, can be a diffusing optic that diffuses the light, can configure the luminaire to produce a split beam pattern, etc. The light engine 505 includes a heat sink, an LED circuit (often called a COB which is an acronym for circuit on board), the zoomable optic, etc.

Figure 6:
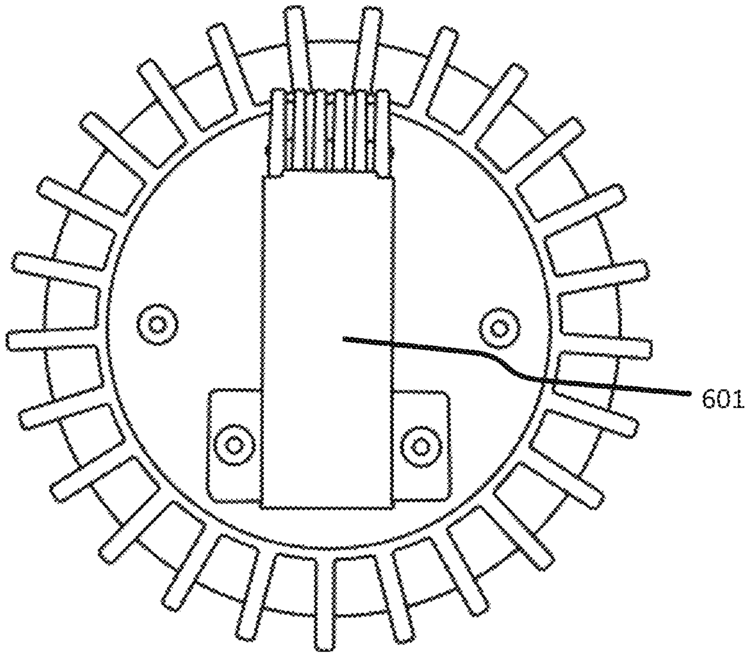
FIG. 6 is an illustration of the back of the light engine, according to some aspects.

FIG. 6 is a rendering of the back of the light engine 505, according to some aspects. The quick connector 302 can connect to a quick connect receptacle 601 on the light engine to thereby provide electric power to the LED circuit. The LED circuit includes one or more LEDs that produce LED light while receiving electric power. The beam produced by the luminaire is the LED light produced by the LEDs after the light passes through the zoomable optic, the reflector, and any conditioning optics when conditioning optics are installed.

Figure 7:
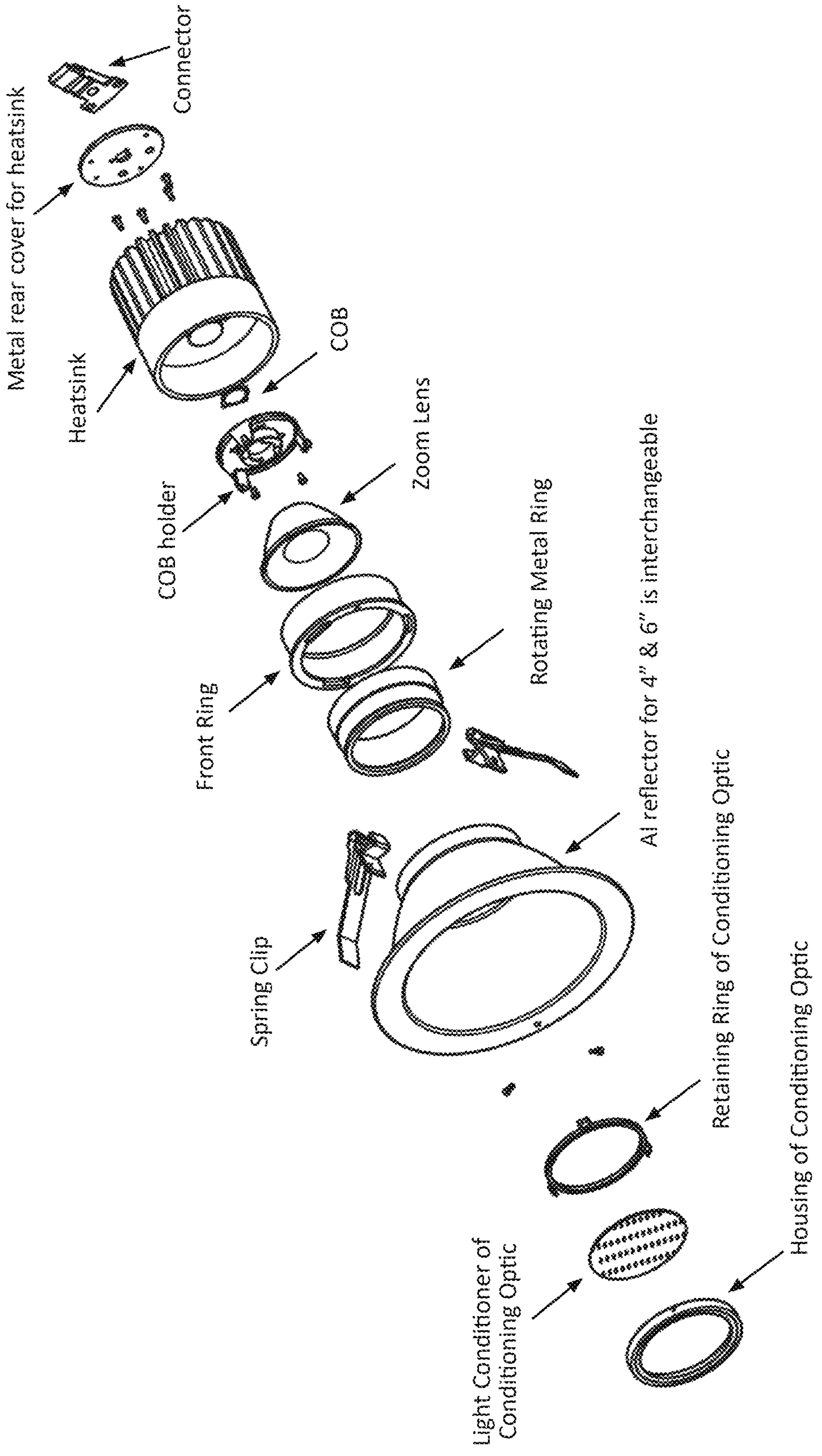
FIG. 7 is an exploded view of a luminaire and a conditioning optic, according to some aspects.

FIG. 7 is an exploded rendering of a luminaire 108 and a conditioning optic, according to some aspects. The light engine has a rotating ring, a front ring, a zoom lens, a chip on board (COB) LED circuit, a COB holder, a heat sink, a rear heatsink cover, and a quick connect receptacle. An example of a zoomable optic 503 includes the rotating ring (also called rotating metal ring), the front ring, and the zoom lens. The rotating ring fits inside of the front ring. Rotating the rotating ring causes the zoom lens to move closer to or further from the LED circuit to thereby increase or decrease the beam angle of the beam produced by the luminaire. The beam angle is the angular width of the beam. In an example, threads on the interior surface of the rotating ring can engage the zoom lens such that rotating the rotating ring moves the zoom lens relative to the LED circuit. The front ring can be attached to the heat sink. The figure shows the rotating ring in front of the front ring although in practice the rotating ring can be behind the front ring and can be held in the heat sink by the front ring. The reflector may attach to the front ring. Another way to discuss or define the beam angle is to discuss or define the solid angle of the light beam. The solid angle is the surface area of a sphere corresponding to a specific beam angle.

The conditioning optic 502 can include a light conditioner, a housing, and a retaining ring. The light conditioner may be held in the housing by the retaining ring. The light conditioner can be a lens, a diffuser, etc. The light conditioner may be thin, fragile, or otherwise unsuitable for being installed in the luminaire. As such, the light conditioner can be held in the housing by the retaining ring to produce a conditioning optic 502 that is suitable for installation in the luminaire. For example, the conditioning optic may be positioned between the reflector and the front ring such that the conditioning optic is held in place when the reflector is attached to the front ring. The front ring may be part of the light engine. As such, the narrow end of the reflector may be configured to hold the conditioning optic to the light engine.

Figure 8A:
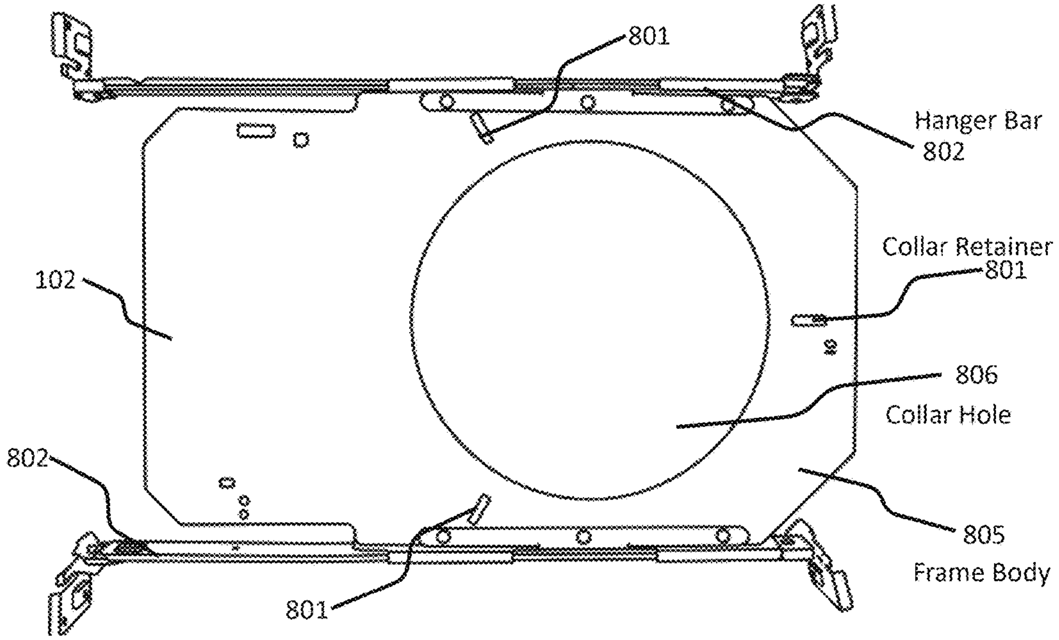
FIG. 8A is a bottom view of a frame, according to some aspects.

FIG. 8A is a bottom view of a frame 102, according to some aspects.

Figure 8B:
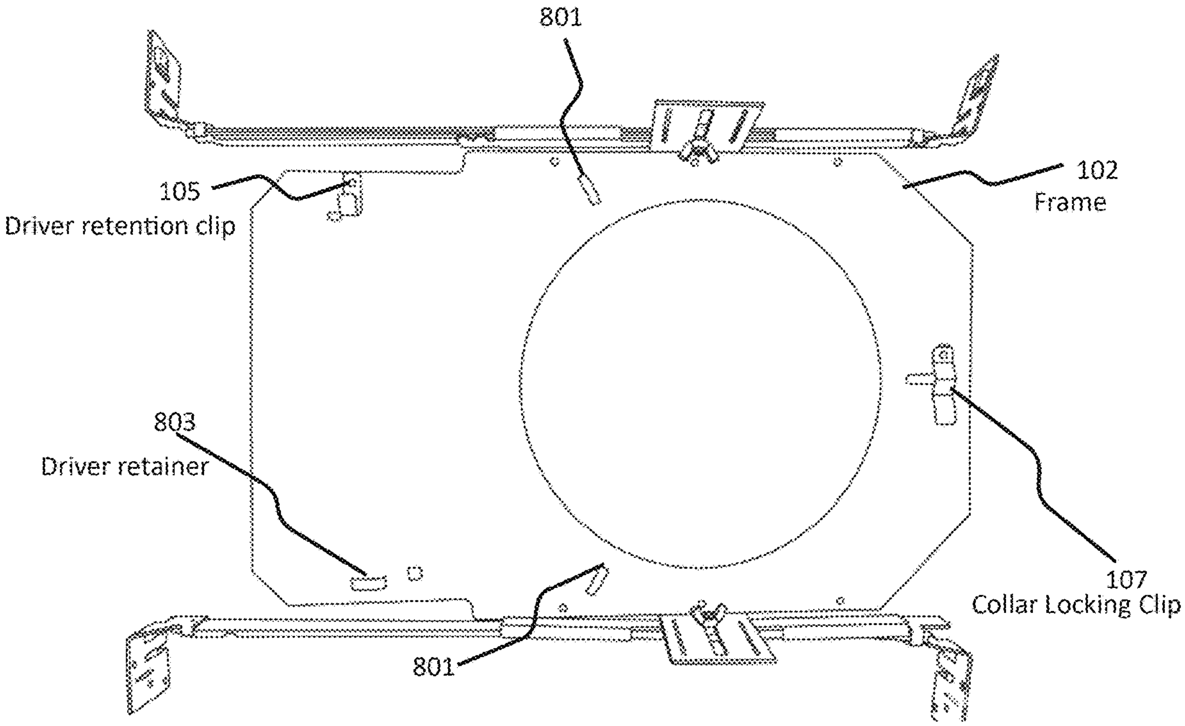
FIG. 8B is a top view of the frame, according to some aspects.

FIG. 8B is a top view of the frame 102, according to some aspects.

Figure 8C:
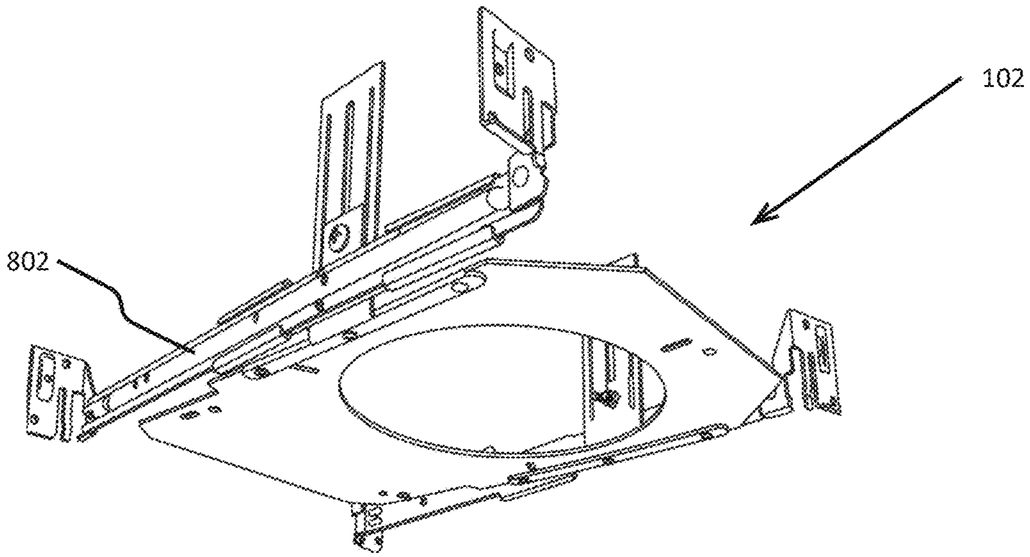
FIG. 8C is a perspective view of the frame, according to some aspects.

FIG. 8C is a perspective view of the frame 102, according to some aspects.

The frame has a frame body 805 between two hanger bars 802. The frame body is attached to the hanger bars. The frame with hanger bars is configured for installation between ceiling joists or rafters. The frame body can be punched from a sheet of metal and the collar retainers 801 can be bands that are punched upward from the frame body. The power source can have a driver tab that slots into the driver retainer 803 to thereby hold one end of the power source to the frame. The power source and the luminaire are removably attached to the frame such that they can be interchangeable with new parts for repair or different parts to change the configuration of the modular downlight.

Figure 9:
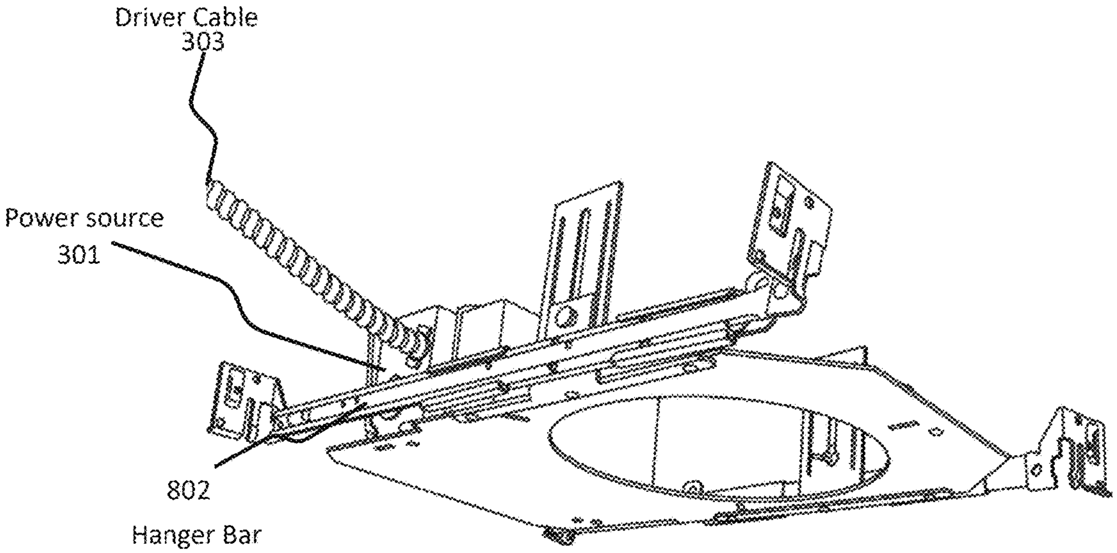
FIG. 9 is a view of the frame as shown in FIG. 8C with a power source installed, according to some aspects.

FIG. 9 is a view of the frame 102 as shown in FIG. 8C with a power source installed, according to some aspects.

Figure 10A:
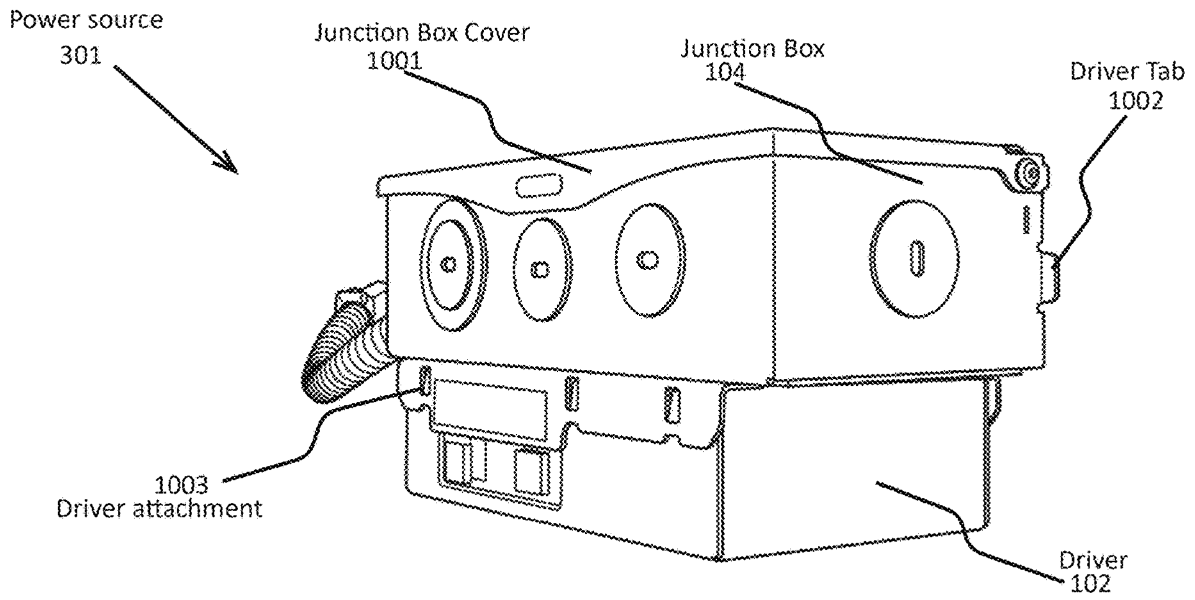
FIG. 10A is an illustration of a power source, according to some aspects.

FIG. 10A is an illustration of a power source 301, according to some aspects.

Figure 10B:
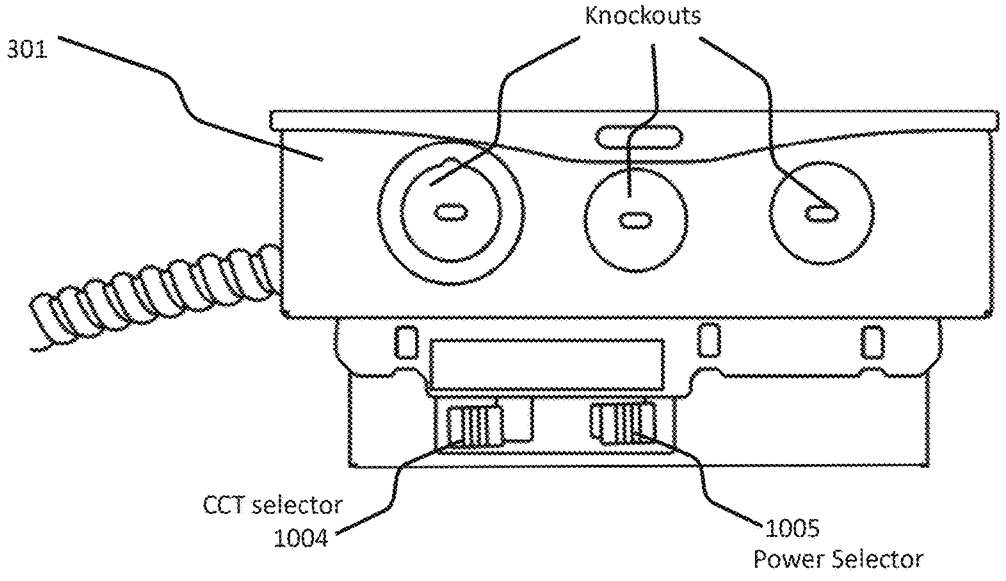
FIG. 10B is another illustration of the power source, according to some aspects.

FIG. 10B is another illustration of the power source 301, according to some aspects. The driver tab 1002 may be slid into the driver retainer 803 shown in FIG. 8B. The power source includes a driver 103 and a junction box 104. Mains power (e.g., 120 VAC) may enter the junction box via a hole produced by knocking out one of the knockouts. Wiring internal to the power source passes the mains power to the driver 103 where the mains power can be converted to the power required for running the LED circuit. The mains power can be connected to the modular downlight by removing the junction box cover 1001 and connecting mains power to the main power inputs of the modular downlight. The driver 103 and the junction box 104 are attached by driver attachment 1003 that may be permanently fixed to the junction box and removably attached to the driver. The driver 103 has a CCT selector 1004 for selecting a color temperature. The driver 103 has a power selector 1005 for selecting the driver's output power.

Figure 11A:
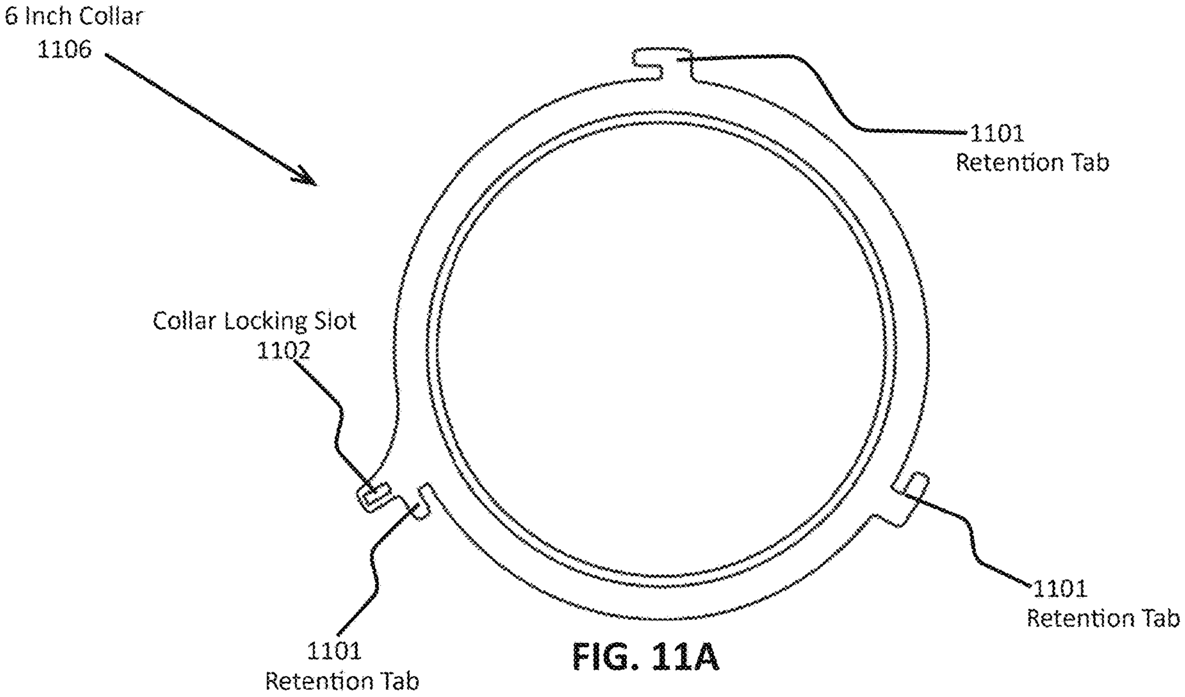
FIG. 11A is a bottom view of a six inch collar, according to some aspects.
Figure 11B:
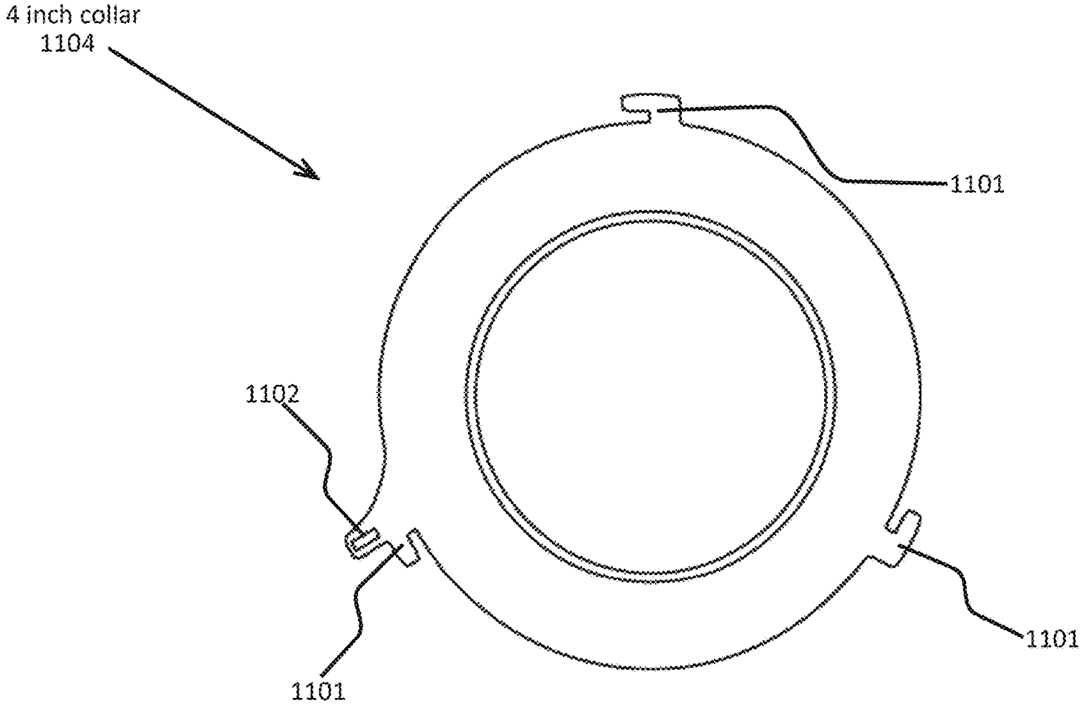
FIG. 11B is a bottom view of a four inch collar, according to some aspects.

FIG. 11A is a bottom view of a six inch collar 1106, according to some aspects. FIG. 11B is a bottom view of a four inch collar 1104, according to some aspects. Both collars (six inch collar 1106 and four inch collar 1104) can be installed in the frame 102. A collar can be installed in the frame by positioning the collar in the frame, aligning the retention tabs 1101 of the collars with the collar retainers 801 of the frame, and rotating the collar such that the retention tabs engage the collar retainers by rotating into the collar retainers. The collar locking clip 107 can engage the collar locking slot 1102 to prevent collar from rotating such that the collar retainers disengage from the retention tabs and free the collar. The collar may be released by disengaging the collar locking clip 107 from the collar locking slot 1102 and rotating the collar such that the collar retainers disengage from the retention tabs and free the collar. The six inch collar 1106 is configured for installation with a six inch luminaire. The four inch collar 1104 is configured for installation with a four inch luminaire. Other sizes of collar may be used for other sizes of luminaires (e.g., five inch collar with 5 inch luminaire).

Figure 11C:
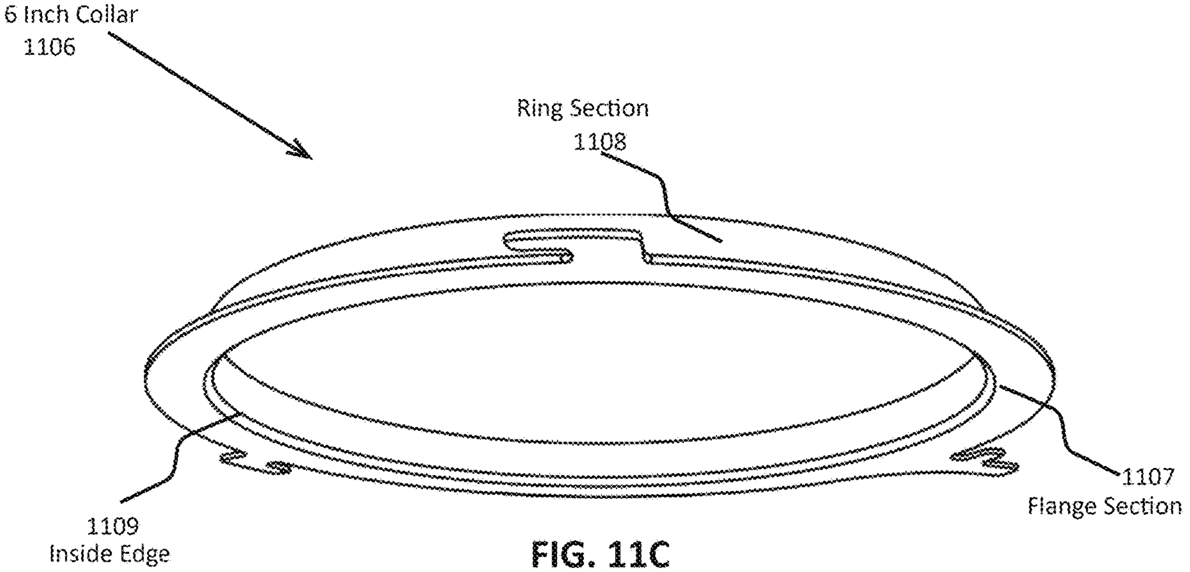
FIG. 11C is a side perspective view of the six inch collar, according to some aspects.
Figure 11D:
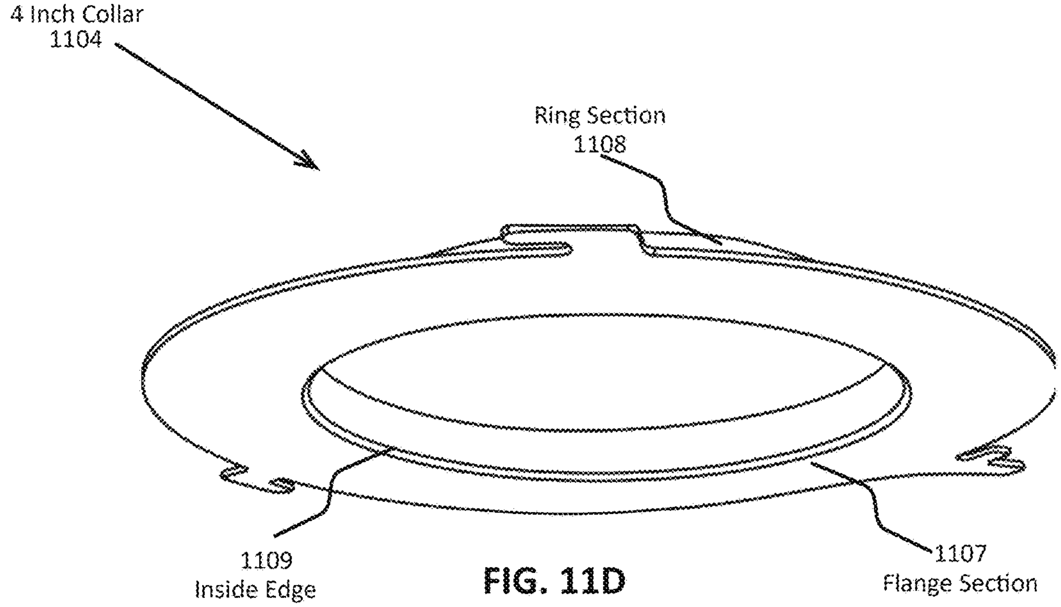
FIG. 11D is a side perspective view of the four inch collar, according to some aspects.

FIG. 11C is a side perspective view of the six inch collar 1106, according to some aspects. FIG. 11D is a side perspective view of the four inch collar 1104, according to some aspects. Both collars include a flange section and a ring section that are joined at the inside edge 1109 of the flange.

Figure 12A:
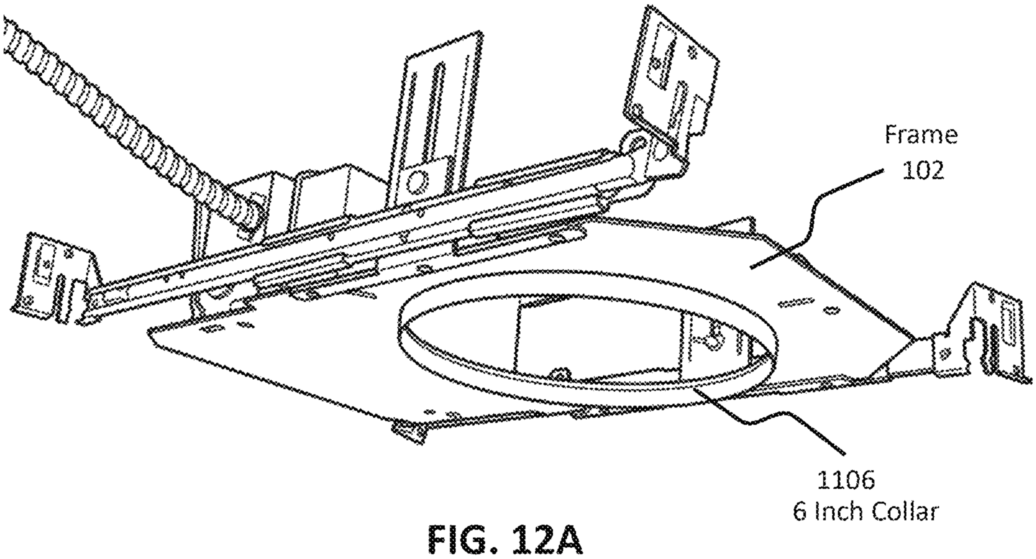
FIG. 12A illustrates a six inch collar installed in a frame, according to some aspects.
Figure 12B:
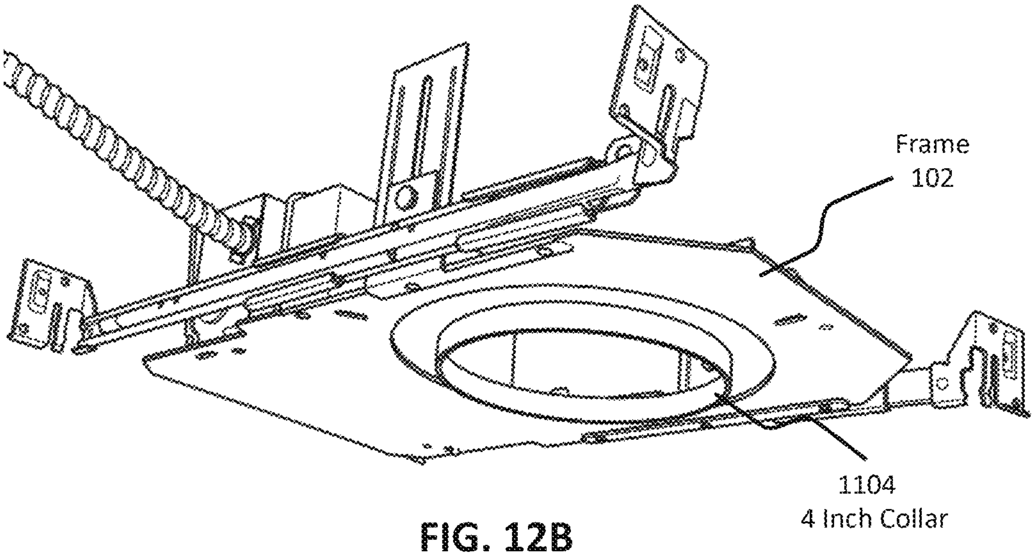
FIG. 12B illustrates a four inch collar installed in a frame, according to some aspects.

FIG. 12A illustrates a six inch collar 1106 installed in a frame 102, according to some aspects. FIG. 12B illustrates a four inch collar 1104 installed in a frame 102, according to some aspects. The ring section can be seen passing through the collar hole 806 in the frame. The flange section 1107 of the collar is above and the frame body. The diameter of the collar hole may be within 2 millimeters of the diameter of the inside edge 1109 of the flange section 1107 as shown in FIG. 12A.

Figure 13A:
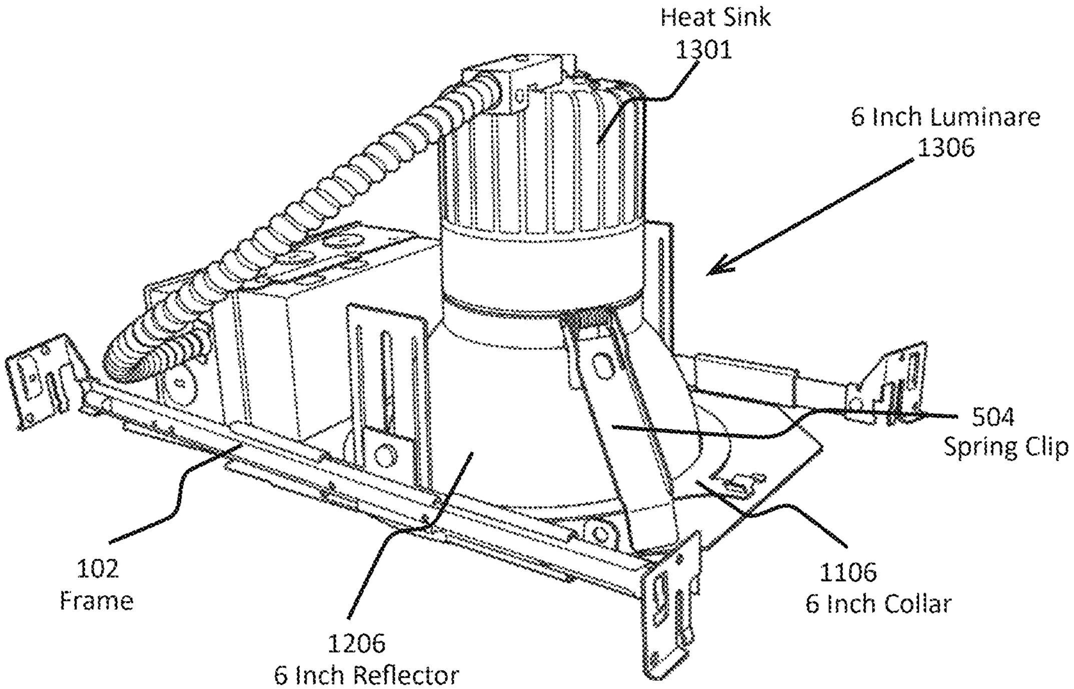
FIG. 13A illustrates a six inch collar and a six inch luminaire installed in a frame 102, according to some aspects.
Figure 13B:
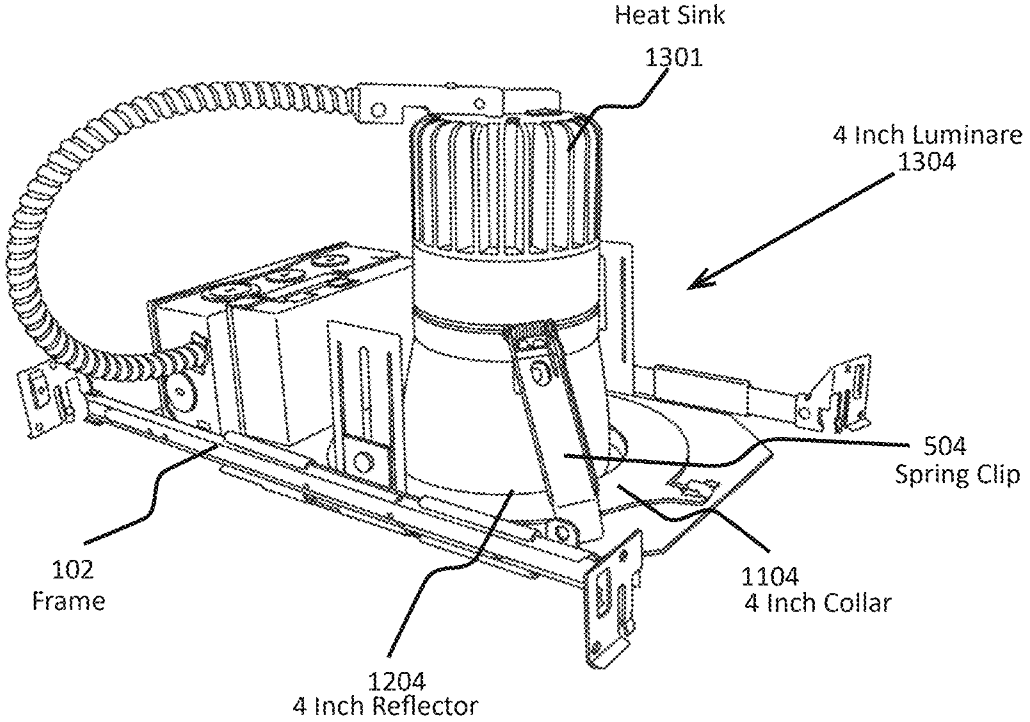
FIG. 13B illustrates a four inch collar and a four inch luminaire installed in a frame 102, according to some aspects.

FIG. 13A illustrates a six inch collar 1106 and a six inch luminaire 1306 installed in a frame 102, according to some aspects. FIG. 13B illustrates a four inch collar 1104 and a four inch luminaire 1304 installed in a frame 102, according to some aspects. The quick connector 302 can be seen to be connected to the quick connect receptacle 601 on top of the heat sink 1301. Furthermore, it can be observed that the four inch luminaire 1304 and the six inch luminaire 1306 have the same light engine 505 but have different reflectors. The six inch luminaire 1306 has a six inch reflector 1206.

In FIG. 13A and in FIG. 13B, the spring clips 504 are preventing the luminaire from falling out of the frame. The luminaire can be installed in the frame by pulling the quick connector 302 through the collar, attaching the quick connector 302 to the quick connect receptacle 601, and then pushing the luminaire up through the collar. The spring clips 504 are pressed into the reflector during installation and then extend out to prevent the luminaire from falling out of the frame.

Figure 14A:
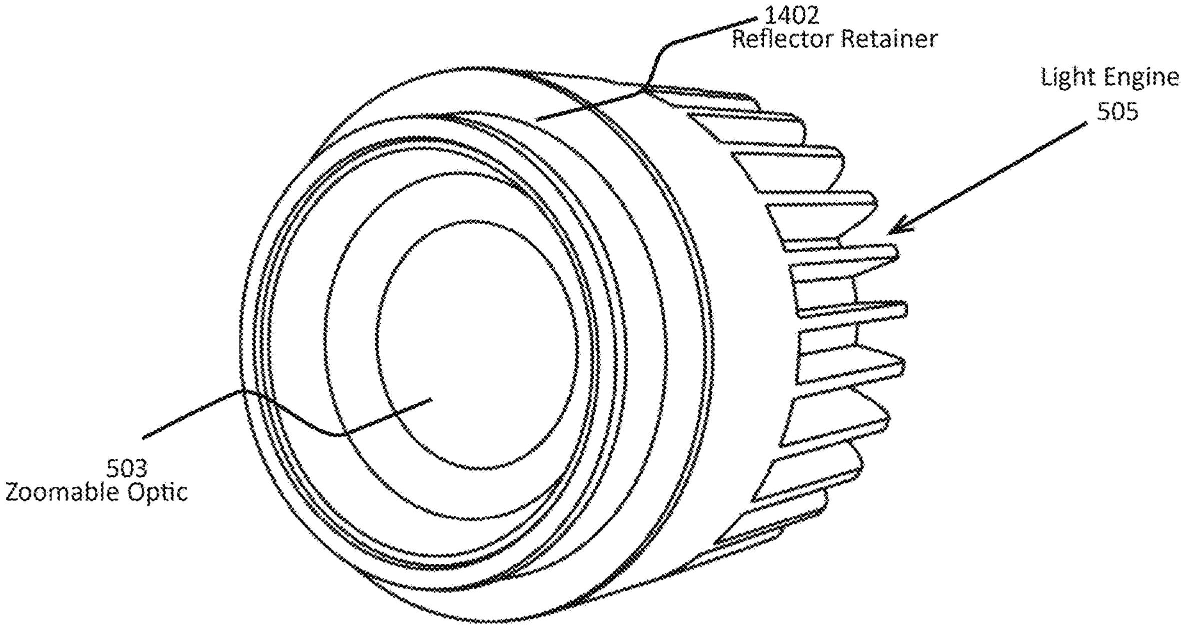
FIG. 14A illustrates a view of the light engine, according to some aspects.
Figure 14B:
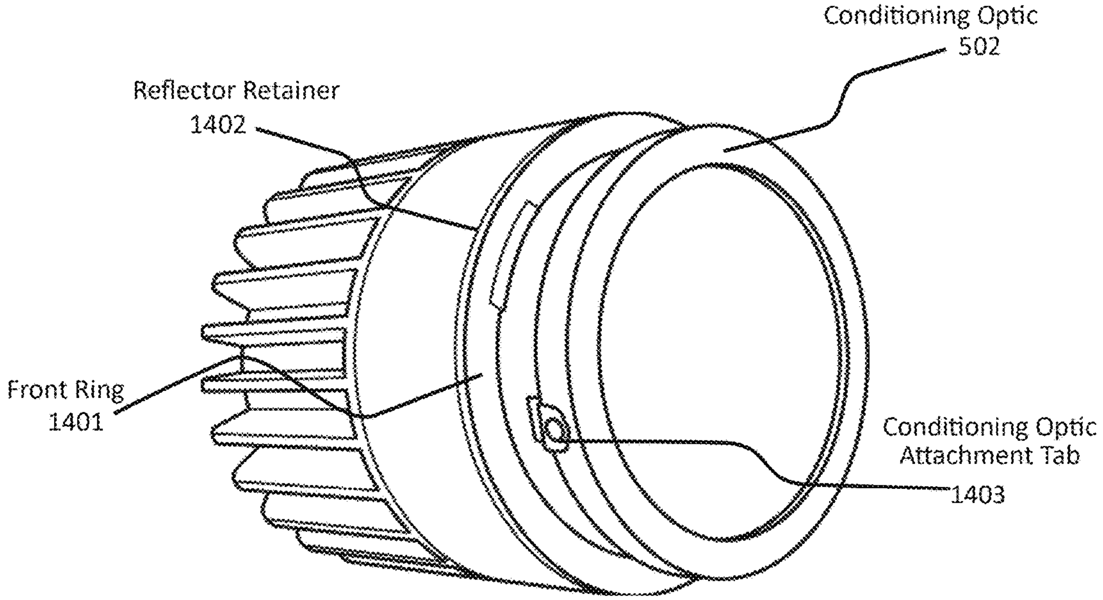
FIG. 14B illustrates a view of the light engine with a conditioning optic, according to some aspects.

FIG. 14A illustrates a view of the light engine 505, according to some aspects. FIG. 14B illustrates a view of the light engine 505 with a conditioning optic 502, according to some aspects. The light engine is fully assembled and the zoomable optic 503 can be seen in the front ring 1401 in FIG. 14A. The front ring 1401 has reflector retainers 1402 to which a reflector can be attached. A reflector 1204, 1206 can have front ring engagements such that rotating the reflector causes the front ring engagements to engage the reflector retainers 1402, thereby attaching the reflector to the light engine 505. A conditioning optic 502 is installed on the light engine 505 in FIG. 14B. The conditioning optic 502 is in front of the zoomable optic and is attached to the light engine 505 by a conditioning optic attachment tab 1403.

Figure 15A:
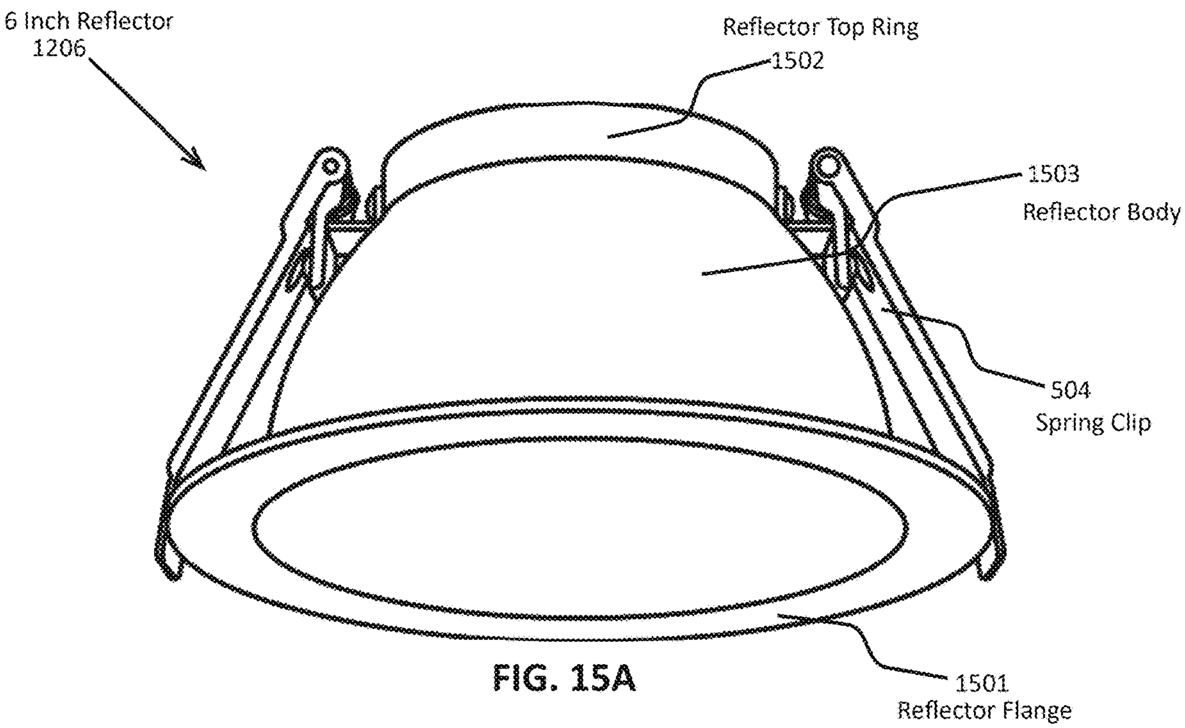
FIG. 15A illustrates a view of a six inch reflector, according to some aspects.

FIG. 15A illustrates a view of a six inch reflector 1206, according to some aspects.

Figure 15B:
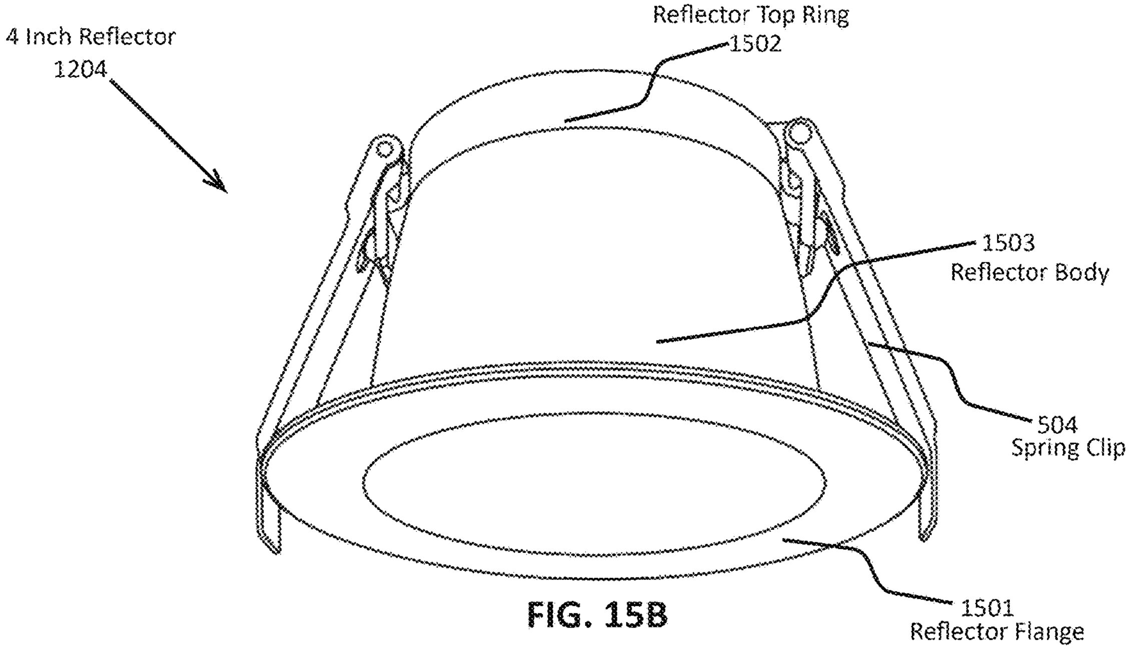
FIG. 15B illustrates a view of a four inch reflector, according to some aspects.

FIG. 15B illustrates a view of a four inch reflector 1204, according to some aspects. Each reflector has a reflector top ring 1502, a reflector body 1503, a reflector flange 1501, and spring clips 504. The reflector attaches to the light engine at the reflector top ring 1502. The reflector flange 1501 can prevent the luminaire from passing completely through the collar during installation. The spring clips 504 can prevent the luminaire from falling out of the frame after installation. The reflector body is between the reflector top ring 1502 and the reflector flange 1501.

Figure 15C:
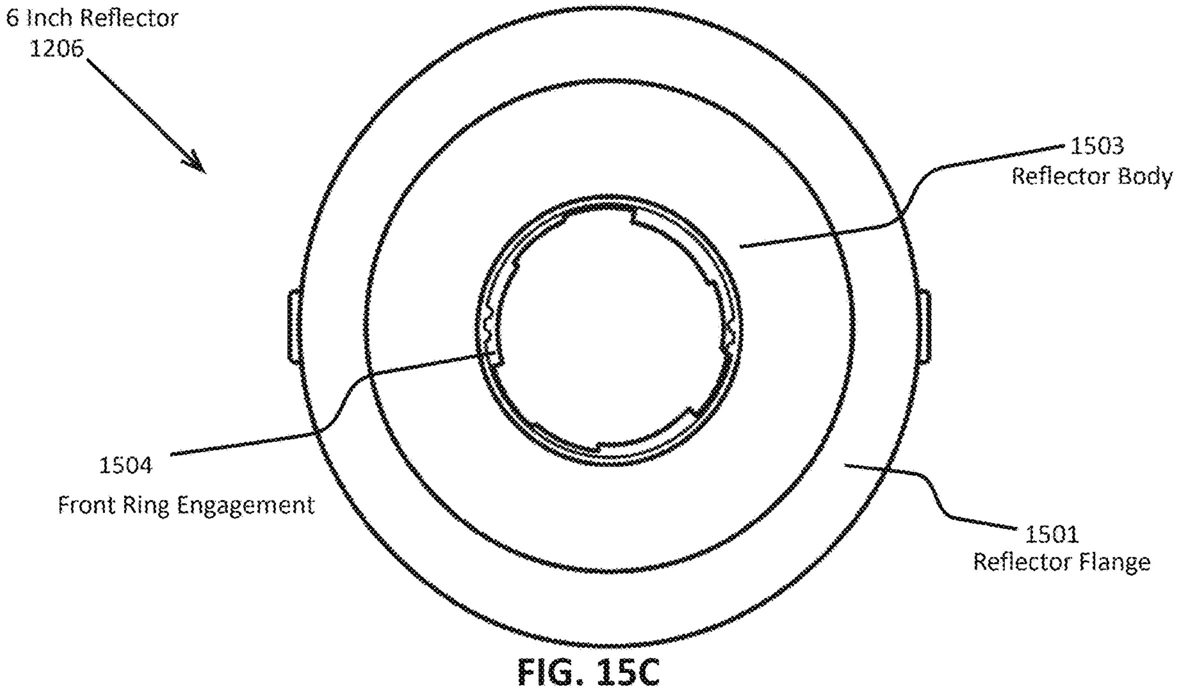
FIG. 15C illustrates a bottom view of a six inch reflector, according to some aspects.
Figure 15D:
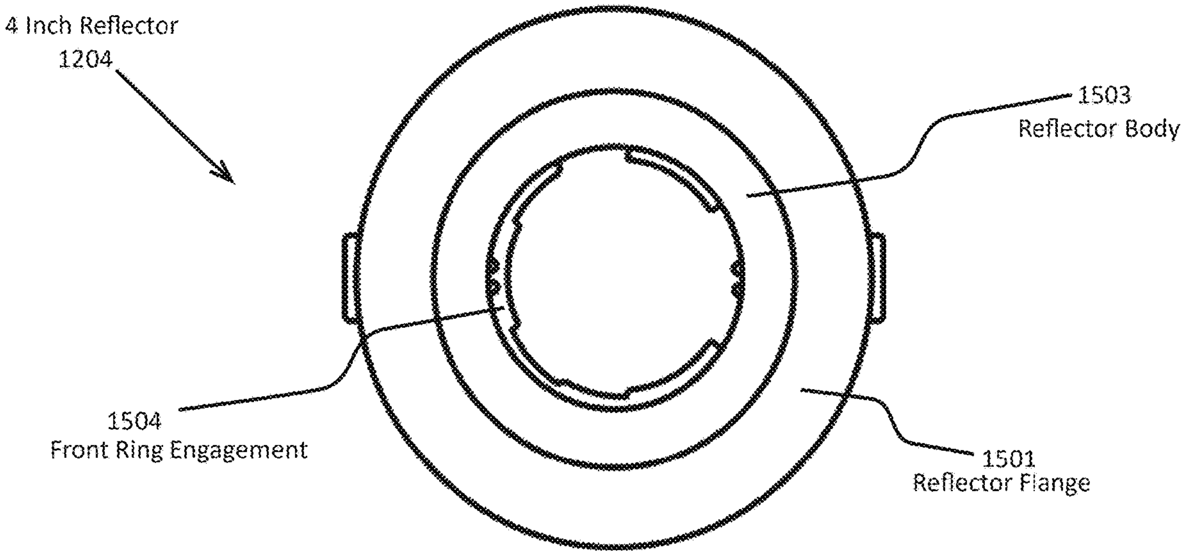
FIG. 15D illustrates a bottom view of a four inch reflector, according to some aspects.

FIG. 15C illustrates a view of a bottom view of a six inch reflector 1206, according to some aspects. FIG. 15D illustrates a view of a bottom view of a four inch reflector 1204, according to some aspects. FIG. 15C and FIG. 15D show the front ring engagements 1504 that engage the reflector retainers 1402 to thereby attach the reflectors to the light engine.

Figure 16A:
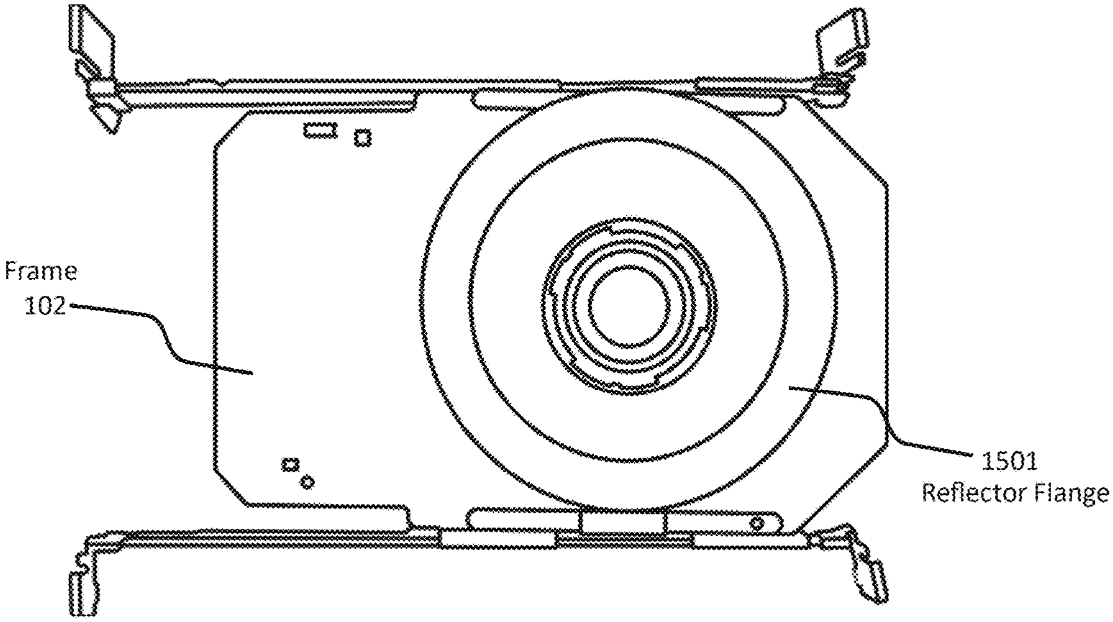
FIG. 16A illustrates a bottom view of a six inch reflector installed in a frame, according to some aspects.
Figure 16B:
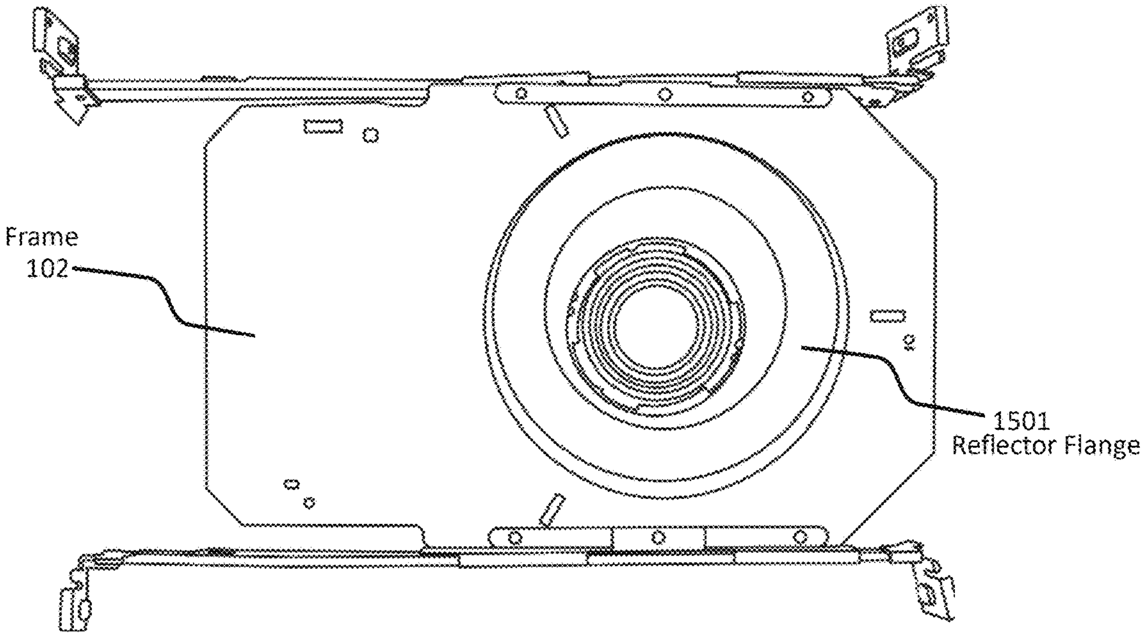
FIG. 16B illustrates a bottom view of a four inch reflector installed in a frame 102, according to some aspects.

FIG. 16A illustrates a bottom view of a of a six inch reflector 1206 installed in a frame 102, according to some aspects. FIG. 16B illustrates a bottom view of a of a four inch reflector 1204 installed in a frame 102, according to some aspects. The frame can be installed in the ceiling of a building and the power source 301 can be connected to mains power. The ceiling may be installed before or after the frame is installed but is most commonly installed first. The ring section 1108 of the collar can extend down into the ceiling. Luminaires can be installed in the modular downlight after the frames are installed above the ceiling. After luminaire installation, the reflector flange 1501 may rest or press against the bottom of the ceiling.

What is claimed is:

1. A system comprising:
- a power source configured to be removably attached to a frame by a driver retainer and a driver retention clip;
- a collar configured to be removably attached to the frame by a collar locking clip and a plurality of collar retainers;
- a luminaire configured to pass through the collar and to be powered by the power source; and
- a plurality of spring clips attached to the luminaire and configured to prevent the luminaire from falling out of the frame.

2. The system of claim 1, further including:
- the frame,
- wherein the frame includes a frame body, two hanger bars attached on opposite sides of the frame body, the driver retainer, the driver retention clip, the collar locking clip, and the collar retainers; and
- wherein the two hanger bars are configured to hold the frame in a ceiling.

3. The system of claim 2, wherein:
- the power source and the collar are removably attached to the frame;
- the luminaire passes through the collar and is electrically connected to the power source; and
- the spring clips prevent the luminaire from falling out of the frame.

4. The system of claim 1 wherein the luminaire includes a zoomable optic configured to vary a beam angle of a light beam produced by the luminaire.

5. The system of claim 2, wherein the luminaire includes:
- a light engine configured to produce a light beam; and
- a zoomable optic configured to vary a beam angle of the light beam.

6. The system of claim 5, wherein the luminaire further includes:
- a conditioning optic attached to the light engine,
- wherein the conditioning optic diffuses the light beam, produces a split beam from the light beam, or produces a wall wash beam from the light beam.

7. The system of claim 1, wherein the luminaire further includes:
- a light engine configured to produce a light beam; and
- a zoomable optic configured to vary a beam angle of the light beam.

8. The system of claim 7, wherein the luminaire further includes:
- a conditioning optic attached to the light engine,
- wherein the conditioning optic diffuses the light beam, produces a split beam from the light beam, or produces a wall wash beam from the light beam.

9. A system comprising:
- a luminaire configured to produce a light beam;
- a plurality of spring clips attached to the luminaire and configured to prevent the luminaire from falling out of a frame, the frame configured to mount the luminaire in a ceiling;
- a zoomable optic in the luminaire and configured to vary a beam angle of the light beam;
- a power source configured to be removably attached to the frame by a driver retainer and a driver retention clip; and
- a collar configured to be removably attached to the frame by a collar locking clip and a plurality of collar retainers.

10. The system of claim 9, wherein the luminaire further includes a conditioning optic configured to diffuse the light beam, produce a split beam from the light beam, or produce a wall wash beam from the light beam.

11. The system of claim 10, wherein the conditioning optic is configured to rotate within the luminaire.

12. The system of claim 9, wherein:
- the luminaire further includes a light engine that produces the light beam; and
- the zoomable optic is in the light engine.

13. The system of claim 10, wherein:
- the luminaire includes a reflector; and
- the conditioning optic is between a light engine and the reflector.

14. The system of claim 9, further including:
- the frame, the frame including a frame body, two hanger bars attached on opposite sides of the frame body, the driver retainer, the driver retention clip, the collar locking clip, and the plurality of collar retainers.

15. The system of claim 9, wherein the luminaire further includes a conditioning optic configured to diffuse the light beam.

16. The system of claim 9, wherein the luminaire further includes a conditioning optic configured to produce a split beam from the light beam.

17. The system of claim 9, wherein the luminaire further includes a conditioning optic configured to produce a wall wash beam from the light beam.

18. A system comprising:
- a beam production means for producing a light beam;
- a beam zooming means for varying a beam angle of the light beam;
- a luminaire means for emitting the light beam, the luminaire means including the beam production means and the beam zooming means;
- a mounting means for removably mounting the luminaire means in a ceiling; and
- a retention means for preventing the luminaire means from falling out of the mounting means a power means for electrically powering the beam production means;

an attachment means for removably attaching the power means to the mounting means;

a collar means for matching a collar hole in the mounting means to the luminaire means; and a collar attachment means for removably attaching the collar means to the mounting means.

19. The system of claim 18, wherein the luminaire means further includes a conditioning means for conditioning the light beam by diffusing the light beam, producing a split beam from the light beam, or producing a wall wash beam from the light beam.

* * * * *